July 19, 1966 E. D. NUNN, JR 3,262,096
CONTROL UNIT AND SYSTEM FOR EMERGENCY VEHICLES
Filed July 9, 1965 4 Sheets-Sheet 1
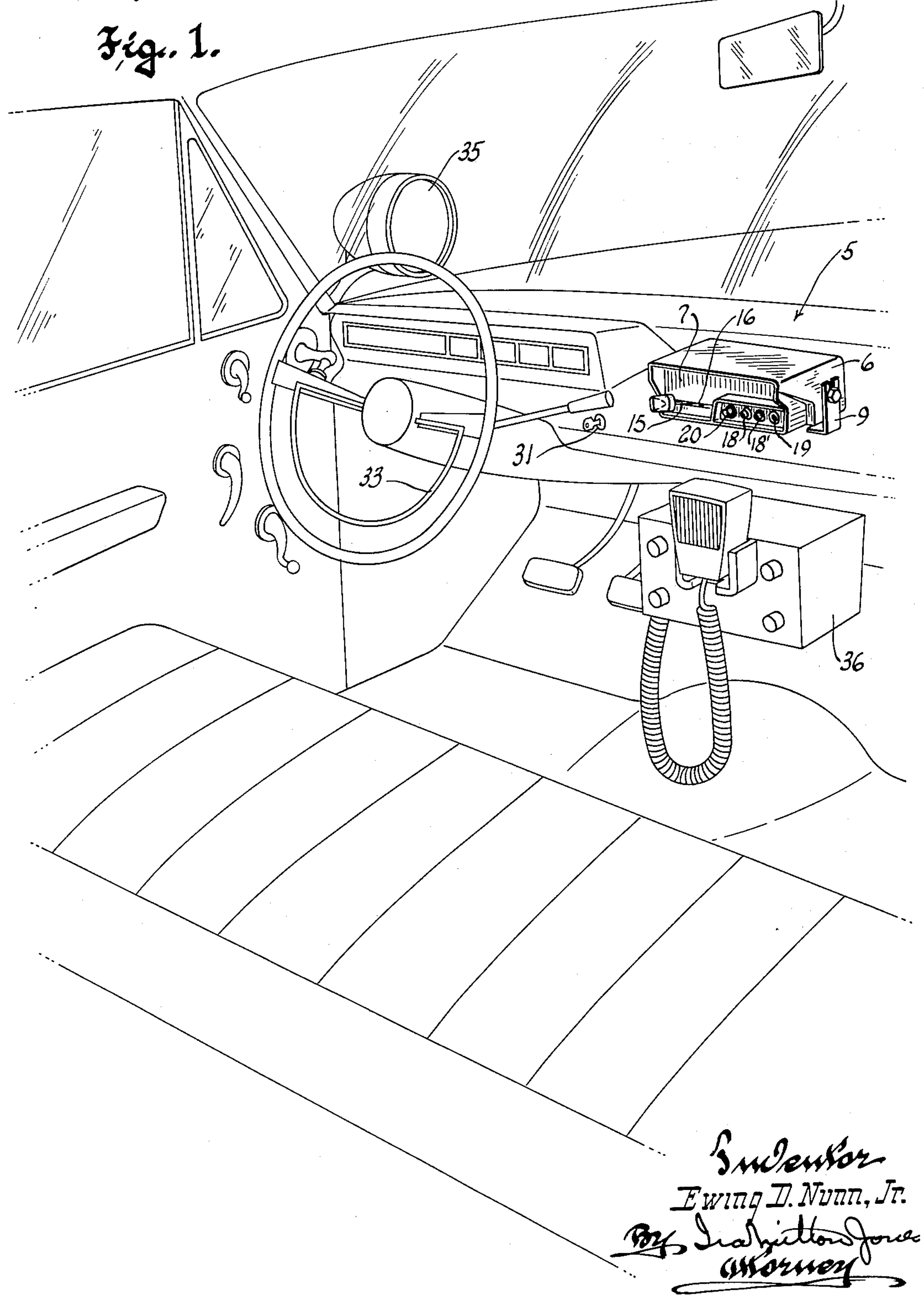
Inventor
Ewing D. Nunn, Jr.
By [illegible]
Attorney

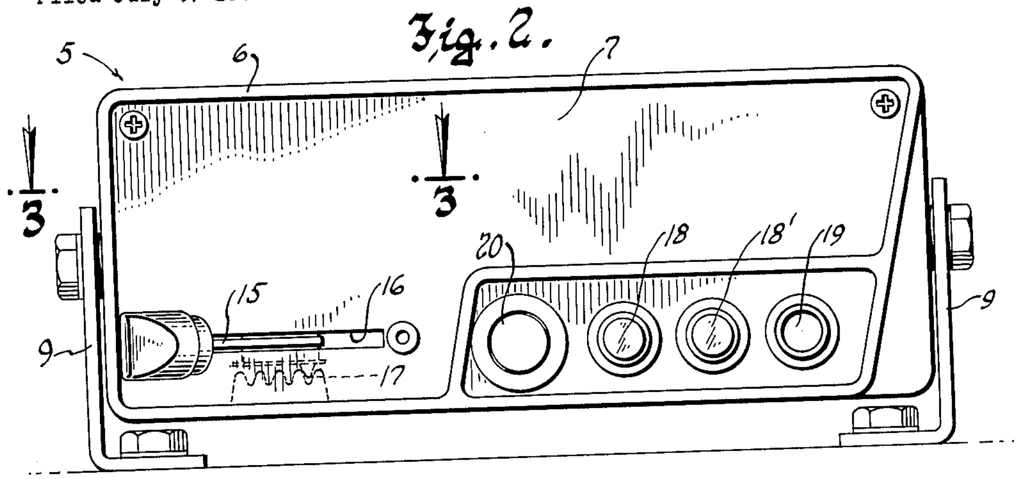
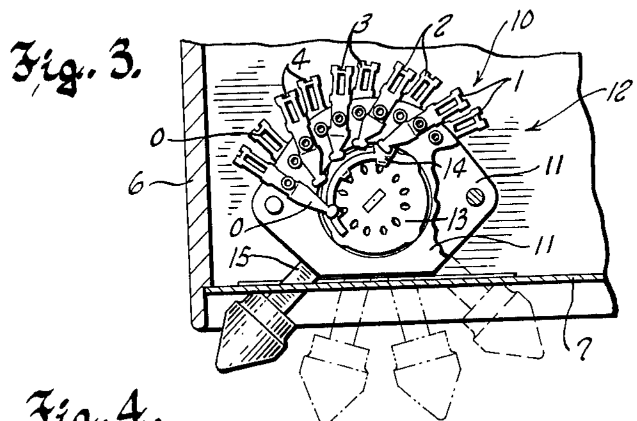
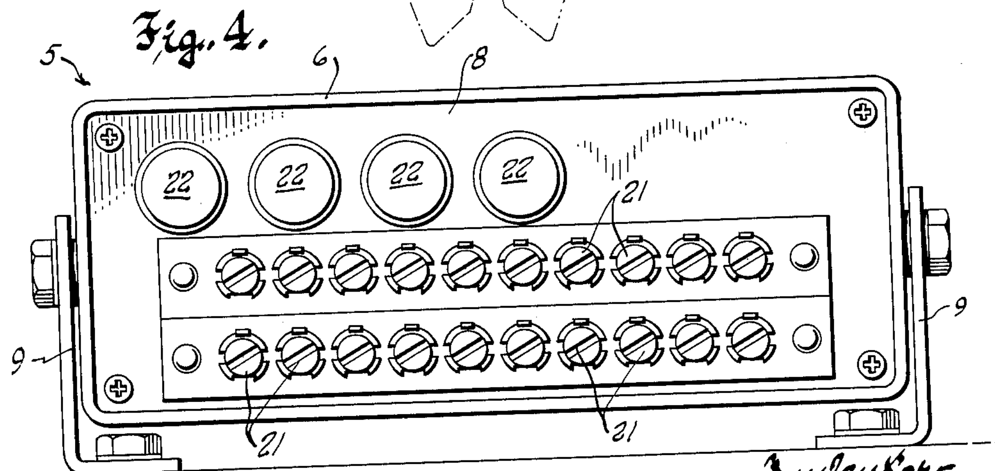
Inventor
Ewing D. Nunn, Jr.
By [signature]
Attorney CONTROL UNIT AND SYSTEM FOR EMERGENCY VEHICLES
Filed July 9. 1965
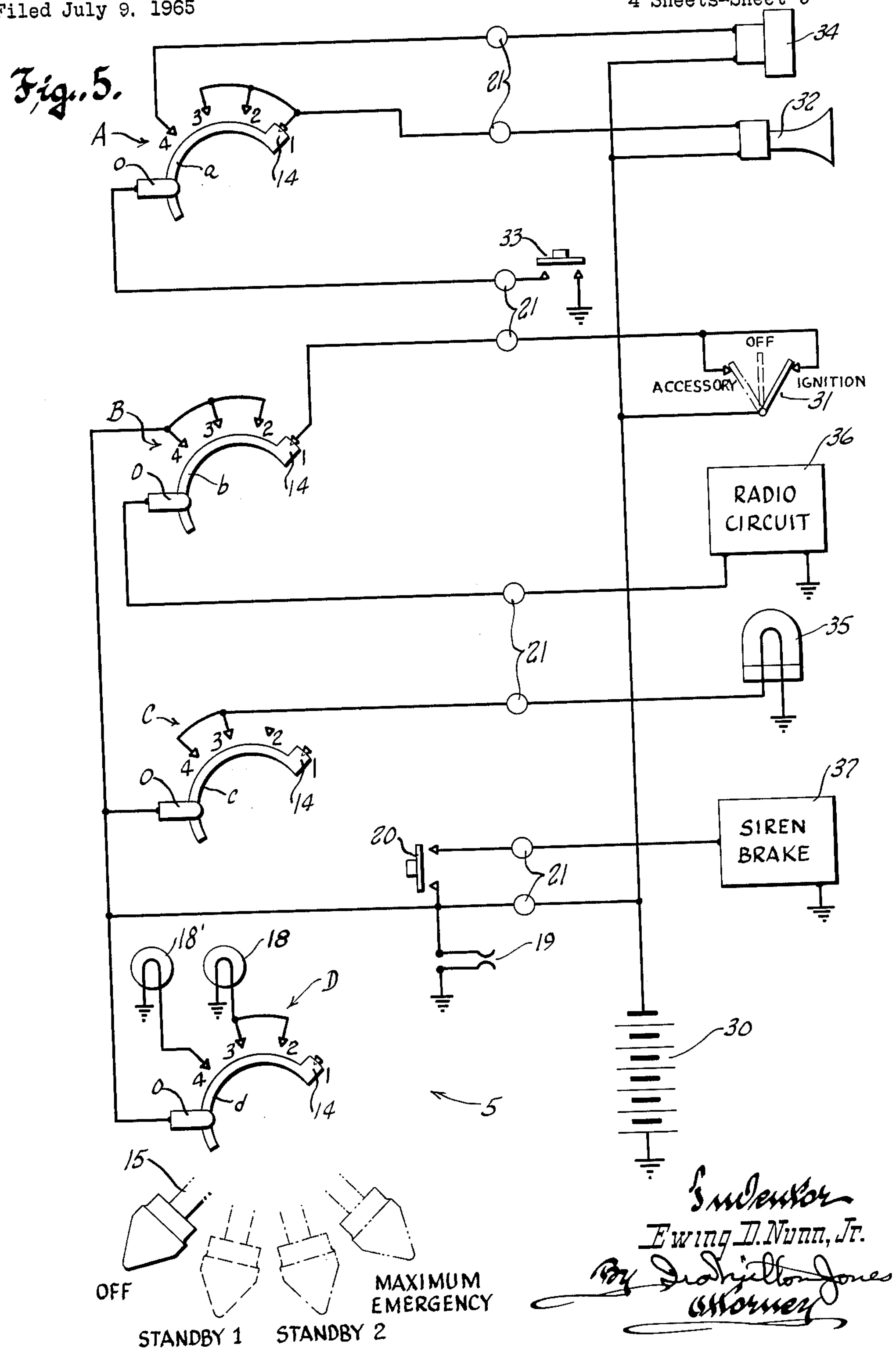
Inventor
Ewing D. Nunn, Jr.
By [signature]
Attorney CONTROL UNIT AND SYSTEM FOR EMERGENCY VEHICLES
Filed July 9, 1965 4 Sheets-Sheet 4
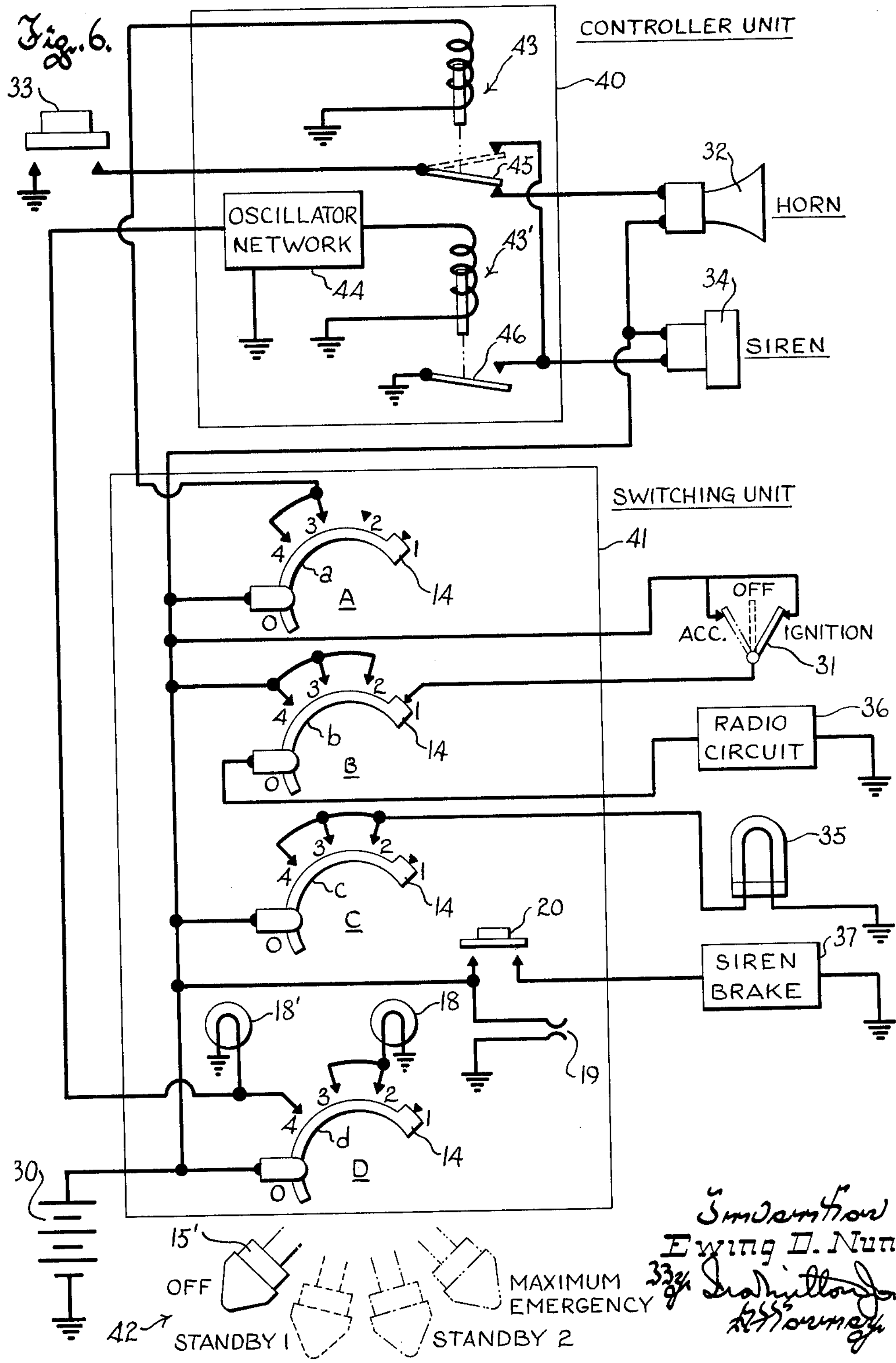
Inventor
Ewing D. Nunn, Jr.
By Ira Milton Jones
Attorney United States Patent Office 3,262,096 Patented July 19, 1966

3,262,096

CONTROL UNIT AND SYSTEM FOR EMERGENCY VEHICLES

Ewing D. Nunn, Jr., 2430 Terraza Place, Fullerton, Calif.

Filed July 9, 1965, Ser. No. 473,902
9 Claims. (Cl. 340—75)

This invention, like that of my copending application Serial No. 320,494, now abandoned, of which this application is a continuation-in-part, relates broadly to electrical systems of automobiles and refers more particularly to a control system for the various special electrical devices with which emergency vehicles such as police squad cars are equipped. All such vehicles have a siren and one or more warning lights—usually a flashing red light which may be mounted on the roof of the vehicle, or on the post at the driver's side of the windshield as a spot light.

Heretofore, it was customary to provide two or more switches, each having at least two positions, to control the operation of these warning devices. The danger inherent in such multiple switching requirements will be apparent upon a moment's reflection. In a tense situation, a driver or operator may throw the wrong switch, or the right switch to the wrong position. In either event the full audible and visual warning would not be given and the probability would exist that the emergency vehicle would be travelling with its siren screeching, but without having its red warning light on, which in many jurisdictions is illegal.

With a view toward overcoming this source of danger, the present invention has as its primary purpose and object to provide an improved control system and control unit therefor which, when installed in an emergency vehicle, makes it impossible to operate the siren without also having the warning light on, and which enables the operator with one quick flip of the hand and without taking his eyes off the road, to set the system for its maximum emergency condition with the siren operable by the same switch that ordinarily is used to sound the horn.

There are, of course, many other electrical devices on an emergency vehicle that are controlled by electric switches, and functions to be performed by the opening or closing of an electrical circuit. For instance, there should be provisions for opening the circuits of the automatic backup and stop lights so that a squad car can patrol an alley without detection—it being understood that its headlights would be turned off for this purpose.

Another need in a police car is the provision of a switch and the necessary circuitry to connect its mobile radio with the battery, independently of the ignition switch, so that the radio can be used and calls heard even though the ignition keys have been removed as a precaution against theft of the car while the driver is out of the car for one reason or another.

Still another requirement to be satisfied in a police car is the momentary closure of circuits for releasing electrically controlled shot gun rack doors and/or trunk lids.

This invention enables all of these other devices and functions to be controlled by means of the same unit used to control the operativeness of the siren and warning lights; and does so through the existing switching equipment on the vehicle so that there is no need for extra switches.

With a view towards still further relieving the driver of an emergency vehicle from concerning himself with anything other than driving the car, it is another object of this invention to incorporate an automatic siren operating means in the control system to periodically actuate or energize the siren on the vehicle whenever the control system is set for maximum emergency, without however preventing manual operation of the siren by the customary horn switch of the vehicle.

Finally, to achieve utmost flexibility in adaptability of the control system to different requirements, it is another object of this invention to provide a control system consisting of two separate units, one of which is a switching unit that is mounted where its actuator is most readily accessible to the driver of an emergency vehicle, and the other of which is a controller unit which may be mounted anywhere on the vehicle and which houses certain relays and switches by which the horn and siren are connected with the current source of the vehicle under control of the actuator of the switching unit.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate two complete embodiments of the invention, constructed according to the best modes so far devised for the practical application of the principles thereof, and in which:

FIGURE 1 is a perspective view illustrating the control unit of this invention mounted in position in a squad car;

FIGURE 2 is a front view of the control unit per se;

FIGURE 3 is a horizontal sectional view through FIGURE 2 on the plane of the line 3—3;

FIGURE 4 is a back view of the control unit;

FIGURE 5 is a diagram of the entire system; and

FIGURE 6 is a diagram of a modified form of the control system of this invention.

Referring now particularly to the accompanying drawings, the numeral 5 designates generally the control unit of this invention. This unit is housed in a relatively small box or case 6 closed at its front by a panel 7 and at its back by a terminal board 8. Mounting brackets 9 at the ends of the case provide means for mounting the unit on the dashboard of a vehicle in a position conveniently accessible to the driver, as shown in FIGURE 1.

Within the case 6 is a rotary gang switch 10 of the wafer type, having a stator consisting of two spaced parallel base plates 11, each of which has two sets of five contacts thereon, those of one set being at one side of the plate and those of the other set being on the opposite side thereof. There are, therefore, four sets of stationary contacts. The switch also has a rotor 13 mounted in the customary manner for rotation within the stator, and provided with four movable contactors 14, each of which cooperates with one set of the stationary contacts.

The switch 10 is mounted behind the front panel 7 with the axis of its rotor parallel to the panel, and upright when the control unit is in its normal position of use. An actuator lever 15 is fixed to the rotor of the switch and projects through a slot 16 in the front panel to provide for quickly moving the rotor from one defined position to another, it being understood that the four movable contactors of the switch rotor move in unison.

Conventional detent means 17 define two extreme positions for the rotor 10, and two intermediate positions. In one of the extreme positions—preferably the one at which the lever 15 points toward the left—the system is in its normal "Off" condition, and in the other extreme or defined limit position when the actuator lever points towards the right, the system is in its "Maximum Emergency" condition.

Of utmost importance is the fact that the switch device, and more specifically its actuator or control member, can be instantaneously flipped to its "Maximum Emergency" position, without requiring the driver to take his eyes off the road, owing to the fact that the actuator moves substantially linearly between its normal "Off" and defined limit or "Maximum Emergency" positions.

The front panel 7 of the control unit, in addition to the actuating lever 15, has two indicator lights 18 and 18' thereon—the first preferably being an amber light and the second a red light—a plug-in jack 19, and a push button 20 for actuating a siren brake. The terminal board 8 has two rods of terminals 21 thereon with which the various electrical devices to be controlled are electrically connected by suitable conductors, it being understood that the terminals are also connected by conductors, inside the case 6, with those of the stationary contacts of the switch device to assure the desired circuitry in the different positions of the switch. Preferably also, the terminal board 8 mounts a plurality of conventional fuses 22, which protect the various circuits included in the system.

Reference should now be made to the diagram, FIGURE 5, wherein the four sections of the multi-position rotary switch, or—more accurately—its four sets of stationary contacts, are designated A, B, C and D, the contacts of each set are numbered 0, 1, 2, 3 and 4, and the four cooperating movable contactors are respectively designated *a*, *b*, *c* and *d*. The four defined positions of the switch—or, more accurately, its rotor—are depicted by the four positions in which the actuator lever 15 is illustrated, the extremes being designated "Off" and "Maximum Emergency," and the two intermediate positions being designated "Standby 1" and "Standby 2." The four positions of the rotor are also identified by the numbers of the stationary contacts of each set thereof; and, again, it is to be understood that the four contactors move in unison with each other and the actuator lever or control member 15.

The diagram, FIGURE 5, also indicates that the vehicle is equipped with the usual battery 30, an ignition switch 31, a horn 32, a horn switch 33 (which may be of the customary ring-type mounted adjacent to the steering wheel of the vehicle, or a foot pedal type), a siren 34, a red warning light 35, and a mobile radio 36. Those of the terminals 21 which are involved in connecting the proper stationary contacts of the switch with the illustrated electrical devices, i.e. the horn 32, and its switch 33, the siren 34, the warning light 35, mobile radio 36, battery 30 and siren brake 37, are included in FIGURE 5, the rest are not.

The conductors by which these connections are made, together with the conductors inside the case of the control unit, constitute circuit means, which as shown in FIGURE 5, connect the various electrical devices and the battery with the proper stationary contacts to achieve the desired results.

Attention is directed to the fact that the contactors *a*, *b*, *c* and *d*, of all of the switch sections are at all times engaged with their respective stationary contacts 0, and with one of their other respective stationary contacts 1, 2, 3 and 4, in each of the four positions of the switch. Thus, in the "Off" position, all of the stationary contacts 0 are directly electrically connected only with their respective stationary contacts 1; in the first intermediate position—"Standby 1"—the contacts 0 are directly electrically connected only with the contacts 2; in the "Standby 2" position, they are directly electrically connected only with the contacts 3; and in the "Maximum Emergency" position they are directly electrically connected only with the stationary contacts 4. However, as shown, in some of the four positions of the switch, some of the stationary contacts 0 are also indirectly electrically connected with others of the stationary contacts 2, 3 or 4.

The manner in which this invention achieves its purpose and object will be clear from the following description of the conditions which obtain with respect to the operability of the various electrical devices, in each of the different positions of the switch, more specifically, its rotor.

In the "Off" position when the stationary contacts 0 and 1 are electrically connected:

(1) The horn is operable in the customary manner by means of the horn switch 33, the control circuit therefor being completed through the switch section "A";

(2) The siren 34 is "dead," i.e. it cannot be operated;

(3) The red warning light is "dead"; and (4) When the ignition switch 31 is in its "Ignition" position shown in full lines, or in its "Accessory" position, the mobile radio becomes operative, the control circuit therefore being completed through switch section B.

In the "Standby 1" position, when the stationary contacts 0 and 2 are electrically connected:

(1) The horn is operable in the customary way by means of its switch 33;

(2) The siren and the red warning light are "dead";

(3) The first indicator light 18, i.e. the amber light, is lit, and the second indicator light, the red one, is out, the energizing connection for the light 18 being made through switch section D; and (4) The mobile radio is now operable independently of the ignition switch, so that it may be "On" and heard even though the ignition key has been removed as a precaution—as when the driver must leave the car. It is the disengagement of the contactor *b* from the stationary contact 1 and its connection with contact 2 in switch section B that effects the circuit change needed to enable the radio to be operated independently of the ignition switch.

In the second "Standby" position of the switch, when the stationary contacts 0 and 3 are electrically connected:

(1) The horn is operable in the customary way by means of the horn ring switch 33;

(2) The red warning light is now operating, i.e. it is "On" (and flashing if it is of the flashing variety), the connection being established through the switch section C;

(3) The siren is "dead";

(4) Only the amber indicator light is lit; and (5) The mobile radio is operable independently of the ignition switch.

In the "Maximum Emergency" position, when the stationary contacts 0 and 4 are electrically connected:

(1) The siren is operable by means of the horn ring switch 33, (2) The red warning light is "On";

(3) The red indicator light 18' is lit and the amber light is "Out"; and (4) The mobile radio is operable independently of the ignition switch.

The functions described above by reference to FIGURE 5, are basic and necessary to the attainment of the objectives of this invention. Obviously, though, the control unit 5 can be used to control other accessory circuits; and, if needed, another section can be added to the switch. In short, all of the various electrical devices that may be present on an emergency vehicle can be controlled by the one conveniently located control unit 5.

It should be understood that, in practice, relays and perhaps remotely controlled switches may be employed to activate at least certain of the electrical devices, so that the control circuits for those devices may not be as direct and simple as illustrated in FIGURE 5. Hence, where the term "circuit means" is employed herein, it is to be understood that it encompasses all such possible ways of selectively rendering the various electrical devices operable by means of the one actuator lever 15 or an equivalent manually operable control member. In every case, the single control member or actuator lever governs the entire system so that by simply moving this control member or actuator lever to the proper position, the various electrical devices on the vehicle and especially its visual and audible warning devices, are placed in the desired relationship from the standpoint of operability, which in the case of the "Maximum Emergency" condition may be done with one quick stroke of the driver's hand, without requiring that the driver take his eyes off the road, and with assurance that the siren cannot be operated without having the red warning light "On."

The modified embodiment of the invention illustrated in FIGURE 6 has two desirable features not present in the control of FIGURE 5. These are—automatic operation of the siren in the "Maximum Emergency" condition of the system, and greater adaptability to different requirements despite standardization of much of the system. To provide these additional features, the system is divided into two separate units. One of these units, identified as the controller unit 40, is standard and remains unchanged in all variations of the system. This unit may be mounted anywhere in or on the vehicle. The other unit 41, known as the switching unit, is comparable to the control unit 5 and, like it, is mounted on the dashboard or instrument panel of the vehicle in a position conveniently accessible to the driver. It is in this unit where the changes are made to adapt the system to different requirements.

The switching unit 41 has a multiple position switch 42 which may be identical with the rotary gang switch 10, and has been so shown in FIGURE 6. Hence, as before, the different positions of the switch are secured by moving an actuator lever 15' between a normal "Off" position and a defined limit or "Maximum Emergency" position through at least one—and in the system disclosed, two—intermediate positions identified as "Standby 1" and "Standby 2."

In FIGURE 6, as in FIGURE 5, these four positions of the multi-position switch or, more appropriately, its rotor, are depicted by the four positions in which the actuator lever 15' is shown; but unlike FIGURE 5, none of the terminals 21 is illustrated in FIGURE 6.

The controller unit 40 contains two relays 43 and 43' and an automatic siren cycling or operating network 44 of any known or conventional form and capable of periodically closing and opening the siren energizing circuit in a predetermined sequence and pattern when the network is energized. The relay 43 controls a selector switch 45 by which either the horn or the siren are connected into the system to be operated when the horn switch 33 is actuated, and the relay 43' closes a switch 46 to energize the siren as the solenoid of the relay is energized by the automatic siren cycling network.

Energization of the relays is effected by the switching unit 41. The solenoid of the relay 43 is energized to move its switch 45 from its "horn" position in which it is shown in full lines in FIGURE 6 to its "siren" position shown in dotted lines, when the actuator of the switch is in its second intermediate (Standby 2) and its defined limit (Maximum Emergency) positions. Hence, in the "Off" and first intermediate positions of the switch, the horn is operable in the customary way by its switch 33 and the siren is "dead," but in the other two positions of the switch it is the siren and not the horn which is operated by closure of the horn switch 33. Attention is directed to the fact that this manual control of the siren is available even when the system is in its "Maximum Emergency" condition, despite the fact that at this time the siren is also under automatic control. This enables the operator to take over control of the siren at any instant, so that if necessary he can sound the siren during an interval when the automatic control is not doing so.

The solenoid of the relay 43', as stated, is energized at the dictation of the automatic siren cycling network, and this network is activated when the switch is in its "Maximum Emergency" or defined limit position, by engagement of the contactor "*d*" with the stationary contact "4" of the D section of the switch.

Although the system as embodied in FIGURE 6 may be clear without further description, the following summary may be helpful in this connection:

(1) In the "Off" position of the switch when contacts 0 and 1 of all of the switch sections are directly electrically connected:

(a) The horn is operable in the customary manner by the horn switch 33, the control circuit therefor being completed through the switch section A;

(b) The siren is "dead" because the relay 43 is deenergized;

(c) The red warning light is "dead;"

(d) Placement of the ignition switch 31 in either its "ignition" position (shown in full lines in FIGURE 6) or in its "accessory" position, renders the mobile radio operative, the control circuit therefor being completed through switch section B.

(2) In the "Standby 1" position when the contacts 0 and 2 are electrically connected:

(a) The horn is still operable in the customary way;

(b) The siren is "dead;"

(c) The red warning light is on, the circuit therefor being completed through the switch section C;

(d) The amber indicator light is lit;

(e) The radio is operable independently of the ignition switch.

(3) In the "Standby 2" position when the contacts 0 and 3 are electrically connected:

(a) The horn-siren selector relay 43 in the controller unit is energized through switch section A, so that closure of the horn switch 33 now operates the siren rather than the horn;

(b) The red warning light is on;

(c) The amber indicator light remains lit;

(d) The radio is operable independently of the ignition switch.

(4) In the "Maximum Emergency" position when the contacts 0 and 4 are electrically connected:

(a) The siren is manually operable by the horn switch since the relay 43 remains energized;

(b) The siren is automatically operated, its control network 44 being energized through switch section D;

(c) The red warning light is on;

(d) The red indicator light is lit and the amber light is out;

(e) The radio is operable independently of the ignition switch.

From the foregoing description, taken in connection with the accompanying drawings, it will be apparent that this invention greatly simplifies the control of the various electrical devices with which police cars and other emergency vehicles are customarily equipped, and that it eliminates the danger of not having the red warning light or lights lit and flashing whenever the siren is in operation, and—moreover—enables using the regular horn switch to operate the siren.

What is claimed as my invention is:

1. Circuit selector means for an emergency vehicle having an electric current source, separate siren and horn circuits alternatively energizable through normally open switch means, and a warning light circuit, said circuit selector means comprising:

(A) switch means including a plurality of multi-position switch elements, each comprising (1) a contact member having a plurality of spaced apart contacts, (2) a contactor member cooperable with the contacts on the contact member, and (3) means mounting said members for movement of one of them relative to the other along a defined path, between a normal off position and a defined limit position through a defined intermediate position, said mounting means so disposing the members that in the course of movement of the movable member between its normal and its limit positions the contactor member has successive engagement with the several contacts on the contact member, (B) a manual actuator movable substantially linearly in opposite directions between normal off and defined limit positions through a defined intermediate position so as to be positionable at its limit position by a rapid movement of the hand unaided by sight;

(C) means so connecting the movable member of each of said multi-position switch elements with the manual actuator as to constrain the several movable members to move to their normal off, limit and intermediate positions in unison with movement of the actuator respectively to its normal off, limit and intermediate positions;

(D) circuit means including conductor means connected with certain of said contacts and connectable with the current source, the normally open switch means and the horn circuit to provide for energization of the horn circuit when the actuator is in its normal position and in an intermediate position;

(E) circuit means including conductor means connected with other of said contacts and connectable with the current source, the normally open switch means and the siren circuit to provide for energization of the siren circuit by closure of said normally open switch means when the actuator is at its limit position; and (F) circuit means including conductor means connected with still others of said contacts and connectable with the current source and the warning light circuit to provide for energization of the warning light circuit when the actuator is in said intermediate and limit positions.

2. The circuit selector means of claim 1, further characterized by:

(A) each of said multi-position switch elements comprising a wafer switch having fixed contacts and a contactor which is rotatable through a defined angle;

(B) mounting means for the switch elements disposing them with their contactors coaxial; and (C) said actuator comprising a lever projecting substantially radially from the axis of the contactors to be swingable about the same.

3. The circuit selector means of claim 2, further characterized by:

a housing in which the switch elements are housed having a front panel which lies in a plane substantially parallel to the axis of the contactors and which has a slot extending transversely to said axis through which said lever projects to have its free end portion accessible outside the housing.

4. The circuit selector means of claim 1, further characterized by:

detent means operatively associated with the actuator for defining the intermediate position thereof.

5. The circuit means of claim 3, further characterized by:

(A) a pair of indicator lights on the panel, and (B) conductor means connecting said indicator lights with certain of said contacts so that one of the indicator lights can be energized in the limit position of the actuator and the other of the indicator lights can be lighted in the intermediate position of the actuator.

6. The circuit selector of claim 1, wherein said circuit means of paragraphs D and E further include (A) a switch common to both said circuit means and which must be in a first operating position to enable energization of the horn circuit and in a second operating position to enable energization of the siren circuit, and (B) relay means operable to effect movement of said switch from one position to the other, said relay means being connected into one of said two circuit means to be energized when it is operative but not when the other of said two circuit means is operative.

7. The circuit selector means of claim 6, further characterized by a normally open automatic siren cycling switch connected in parallel with said normally open switch means when the circuit means of paragraph E is operative, a pulsing means operatively connected with said normally open automatic siren cycling switch to periodically close the same when said pulsing means is energized, and circuit means including conductor means connected with still another of said contacts and connectible with the current source and said pulsing means to energize the latter when the actuator is in its defined limit position.

8. Circuit selector means for an emergency vehicle having an electric current source, a horn, a siren, a normally open horn switch, and a warning light, said circuit selector means comprising:

(A) a controller unit having a relay with (1) a double throw switch biased to normally maintain a first circuit closed and a second circuit open, and (2) a solenoid which when energized reverses the position of said switch to open the first circuit and close the second;

(B) a switching unit entirely separate from the controller unit and having (1) multiposition switching means with a plurality of stationary contacts and cooperating movable contactor means, the contactor means being movable between a normal off position and a defined limit position through a defined intermediate position, (2) a manual actuator movable substantially linearly in opposite direction between normal off and defined limit positions through a defined intermediate position so as to be positionable at its limit position by a rapid movement of the hand unaided by sight, and (3) means so connecting the movable contactor means with the manual actuator as to constrain the former to move to the normal off, defined limit and defined intermediate positions in unison with movement of the actuator respectively to its normal off, defined limit and defined intermediate positions;

(C) circuit means including conductor means connected with the switch of the relay in the controller unit and connectible with the current source, the horn switch, the horn and the siren, to effect energization of the horn when the horn switch is closed while the solenoid of the relay is deenergized and to effect energization of the siren when the solenoid of the relay is energized;

(D) circuit means including conductor means extending from the controller unit to the switching unit and connected with the solenoid of the relay and with certain of the stationary contacts of the multiposition switch of the switching unit and connectible with the current source to effect energization of the relay solenoid only when the actuator is in its defined limit position and an intermediate position, so that closure of the horn switch while the actuator is in its normal off position energizes the horn, while closure thereof when the actuator is in its defined limit position and said defined intermediate position energizes the siren; and (E) circuit means including conductor means connected with others of said stationary contacts and connectible with the current source and with the warning light to effect energization of the warning light when the actuator is in said intermediate position and in its defined limit position but not when it is in its normal off position.

9. The circuit selector means of claim 8, further characterized by:

an automatic normally open siren-energizing switch in the controller unit, a solenoid to close said switch, an oscillator network connected with the solenoid to effect intermittent energization of the solenoid as long as the oscillator network is energized, and circuit means including conductor means connecting the oscillator network with one of the stationary contacts of the multiposition switch means to connect the oscillator network with the current source to energize the latter but only when the actuator is in its defined limit position.

No references cited.

NEIL C. READ, *Primary Examiner.*

I. J. LEVIN, *Assistant Examiner.*